United States Patent
Ernstson et al.

(10) Patent No.: US 10,647,353 B2
(45) Date of Patent: May 12, 2020

(54) ELECTROMECHANICAL POWER STEERING SYSTEM, METHOD FOR DETERMINING AN ABSOLUTE ANGLE OF ROTATION, AND METHOD FOR CALIBRATING A MEASURING DEVICE FOR MEASURING AN ABSOLUTE ANGLE OF ROTATION

(71) Applicants: THYSSENKRUPP PRESTA AG, Eschen (LI); thyssenkrupp AG, Essen (DE)

(72) Inventors: Gernot Ernstson, Feldkirch (AT); Tivadar Toth, Paty (HU); Konstantin Schwarzkopf, Gams (CH); Peter Knoll, Lindau (DE); Sedat Sen, Heerbrugg (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 218 days.

(21) Appl. No.: 15/772,322

(22) PCT Filed: Oct. 27, 2016

(86) PCT No.: PCT/EP2016/075902
§ 371 (c)(1),
(2) Date: Apr. 30, 2018

(87) PCT Pub. No.: WO2017/072217
PCT Pub. Date: May 4, 2017

(65) Prior Publication Data
US 2018/0319440 A1 Nov. 8, 2018

(30) Foreign Application Priority Data
Oct. 29, 2015 (DE) .................. 10 2015 013 965

(51) Int. Cl.
*B62D 15/02* (2006.01)
*B62D 5/04* (2006.01)

(52) U.S. Cl.
CPC ....... *B62D 15/0235* (2013.01); *B62D 5/0421* (2013.01); *B62D 5/0457* (2013.01); *B62D 15/0215* (2013.01)

(58) Field of Classification Search
CPC ............ B62D 15/0235; B62D 15/0215; B62D 5/0421; B62D 5/0457
See application file for complete search history.

(56) References Cited

U.S. PATENT DOCUMENTS

| | | | | |
|---|---|---|---|---|
| 6,390,229 B1 * | 5/2002 | Kaji | ................. | B62D 5/0463 180/443 |
| 6,738,725 B2 * | 5/2004 | Koga | ................. | B62D 15/02 324/207.21 |

(Continued)

FOREIGN PATENT DOCUMENTS

| CN | 1432789 A | 7/2003 |
|---|---|---|
| CN | 102066877 A | 5/2011 |

(Continued)

OTHER PUBLICATIONS

English Translation of International Search Report issued in PCT/EP2016/075902, dated Jan. 4, 2017 (dated Jan. 17, 2017).

*Primary Examiner* — Anne Marie M Boehler
*Assistant Examiner* — Michael R Stabley
(74) *Attorney, Agent, or Firm* — thyssenkrupp North America, LLC (57) ABSTRACT

A device and a method may be used to determine a highly accurate absolute angle of rotation Xt of the rotational position of a rotatably supported steering shaft. Rotation of a rotor of an electric motor with a gearing with a gearing transmission factor K for power assistance may be coupled into rotation of the steering shaft. A rotational position of (Continued)

rotation of the rotor can be measured by means of a rotor position sensor and by using a number of revolutions of the rotor that have occurred. This value is used directly to determine the highly accurate absolute angle of rotation Xt of the steering shaft. Calibration methods involve determining initial values from which the counting of revolutions or the calculations occur.

11 Claims, 5 Drawing Sheets

(56) References Cited

U.S. PATENT DOCUMENTS

| | | | | |
|---|---|---|---|---|
| 6,816,765 | B2* | 11/2004 | Yamamoto | B62D 5/0463 |
| | | | | 180/407 |
| 8,467,938 | B2* | 6/2013 | Oya | B62D 5/0457 |
| | | | | 180/446 |
| 8,862,325 | B2* | 10/2014 | Soos | B62D 5/0424 |
| | | | | 180/444 |
| 8,967,321 | B2* | 3/2015 | Banno | B62D 5/0481 |
| | | | | 180/446 |
| 9,174,668 | B2* | 11/2015 | Kichise | B62D 5/0409 |
| 2003/0122542 | A1 | 7/2003 | Koga | |
| 2013/0030653 | A1 | 1/2013 | Soos | |
| 2014/0257642 | A1 | 9/2014 | Kichise | |
| 2014/0353073 | A1* | 12/2014 | Banno | B62D 5/0481 |
| | | | | 180/446 |

FOREIGN PATENT DOCUMENTS

| | | |
|---|---|---|
| CN | 102905954 A | 1/2013 |
| CN | 104029716 A | 9/2014 |
| CN | 104210532 A | 12/2014 |
| DE | 600 11 684 T | 6/2005 |
| DE | 102008011448 A | 9/2009 |
| DE | 102008021849 A | 11/2009 |
| DE | 102014210245 A | 12/2014 |
| DE | 102013218954 A | 4/2015 |
| WO | 2015/078664 A | 6/2015 |

* cited by examiner

ELECTROMECHANICAL POWER STEERING SYSTEM, METHOD FOR DETERMINING AN ABSOLUTE ANGLE OF ROTATION, AND METHOD FOR CALIBRATING A MEASURING DEVICE FOR MEASURING AN ABSOLUTE ANGLE OF ROTATION

CROSS REFERENCE TO RELATED APPLICATIONS

This application is a U.S. National Stage Entry of International Patent Application Serial Number PCT/EP2016/075902, filed Oct. 27, 2016, which claims priority to German Patent Application No. DE 10 2015 013 965.7, filed Oct. 29, 2015, the entire contents of both of which are incorporated herein by reference.

FIELD

The present disclosure generally relates to steering systems, including electromechanical power steering systems and methods for measuring an absolute angle of steering of a steering shaft.

BACKGROUND

Steering angle sensors measure the turning angle of the steering wheel of a motor vehicle. Accordingly, under the term "steering angle" in the present description, the angle of rotation of the steering shaft and of the steering wheel coupled thereto is to be understood, not the turning angle of the steered wheels of the vehicle, however. Among other things, this information is required for the vehicle dynamics control, the electronic stability program (ESP). The general problem with such determinations of the angle of rotation is that the steering shaft makes a plurality of revolutions possible in order to move the steering system from steering stop to steering stop. Therefore, in the case of the most commonly used sensors, a continuous recording and saving of the current rotation angle position of the steering wheel is required, since common angle sensors can measure a maximum of 360°, however, a motor vehicle steering wheel has an angle range of +/−720° (four revolutions in total) or more.

In the publication DE 10 2008 011 448 A1, a solution is suggested where the steering shaft is detected by two gear transmissions, whereby a first gear transmission is a hypocycloid transmission, with which an absolute angle value can be determined via a plurality of revolutions. A second gear transmission is used to improve the angular resolution so that the angle of rotation can be more accurately determined. By means of the calculated combination of both detected angle signals, a determination of the absolute angle is made possible. The proposed solution, however, is particularly complex due to the use of two gearings and the calibration of the absolute angle is complex since the neutral position or straight position must first be found respectively.

DE 600 11 684 T2 discloses a solution where two sensors are used, of which one monitors the position of the steering shaft and the other monitors the position of the rotor of the servomotor in order to generate a clear measurement of the steering shaft angle across a range of angles beyond a full rotation. Thereby, an increasing or decreasing incrementation of revolutions takes place in order to determine an absolute angle by means of the combination of both signals. A disadvantage of this solution is the complex calibration of the measurement signal to the absolute angle.

An integral construction unit made of a steering angle sensor and a torque sensor is known from WO 2015/078664 A1, wherein the steering angle sensor has a gearing where the position of two gears is determined in order to calculate the absolute angle of steering.

Conventional systems also require a device that detects the steering angle even when ignition is switched off so that the correct steering angle is available upon starting the vehicle and the control system of the electromechanical power steering can function. Furthermore, using a conventional system, the measuring accuracy can only be achieved with great effort.

Thus a need exists for an electromechanical power steering system with a system for determining a highly-accurate absolute angle of its steering shaft, which can be easily calibrated with a high level of accuracy and which additionally has a simple and inexpensive construction.

BRIEF DESCRIPTION OF THE FIGURES

FIG. 9 is a detail view of a section of the diagram of FIG. 7 with error fields drawn in.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to electromechanical power steering systems and methods for measuring an absolute angle of steering of a steering shaft of an electromechanical power steering system. The present disclosure also generally relates to methods for calibrating measurement devices for measuring absolute angle of steering of steering shafts of electromechanical power steering systems.

The angle of rotation is to be understood as an absolute angle of rotation, which can extend across a plurality of revolutions of the shaft, for example +/ −1800°. Furthermore, it should be understood that the term 'absolute angle of rotation' (Xt1) may also be referred to as 'first absolute angle of rotation' (Xt1). Likewise, it should be understood that the term 'highly accurate absolute angle of rotation' (Xt) may also be referred to as 'second absolute angle of rotation' (Xt).

Highly accurate measurement is to be understood in that the measuring accuracy of the angle measurement at least corresponds to the accuracy of the rotor position sensor used.

Accordingly, the invention suggests an electromechanical power steering system for a motor vehicle, comprising
   a steering shaft, which is pivot-mounted around a steering shaft axis of rotation and can assume various rotational positions,
   an electric motor with a rotor, the rotation of which is coupled into the power steering system and a rotor position sensor for measuring a rotor angle Yt of the rotor,
   a steering angle sensor unit for the measurement of the absolute angle of rotation Xt1 of the rotational position of the steering shaft in comparison to a predefined output rotational position,
where the power steering system furthermore comprises:
   an evaluation unit for combining the rotor angle Yt with the absolute angle of rotation Xt1 to determine a highly accurate absolute angle of rotation Xt of the rotational position of the steering shaft,
   wherein the evaluation unit comprises means to store at least two measurement tuples, wherein each measurement tuple comprises an angle value of a rotor angle (Yk) and an angle value of a related absolute angle of rotation (Xk) of the rotational position of the steering shaft,
   wherein the evaluation unit comprises an adder to calculate the highly accurate absolute angle of rotation Xt of the rotational position of the steering shaft, which can determine the highly accurate absolute angle of rotation Xt of the rotational position of the steering shaft based on a stored measurement tuple Xk, Yk by means of adding or subtracting the measured rotor angle Yt.

That means that the accuracy of the measurement is determined directly by the accuracy of the rotor position sensor, although the rotor position sensor rotates several times during the only few revolutions, which the steering shaft carries out at a maximum. The steering angle sensor unit is only used to determine the approximate position. Thereby, preferably, exactly one steering angle sensor unit is used.

Usually, the steering shafts in motor vehicles are divided into an input shaft or an upper steering shaft, which is connected to a steering wheel, and an output shaft or lower steering shaft, which is connected to the steering transmission to swivel the wheels, and both are connected to each other in a torsionally flexible manner by means of a torsion rod. The torsion of the upper steering shaft opposite the lower steering shaft is used in order to determine the torque introduced by a driver into the steering system. However, in the process, only a few angular degrees of relative torsion are permitted in order to ensure the controllability of the motor vehicle. In terms of the invention, it is possible to determine the highly accurate absolute angle of rotation of the rotational position of the upper steering shaft or, however, as an alternative, of the lower steering shaft. The presented devices and methods can solve both objects. Accordingly, the upper steering shaft or the lower steering shaft are assumed under the synonym "steering shaft". However, it is preferred to determine the rotational position of the lower steering shaft.

Thereby, further features are advantageously designed so that the steering angle sensor unit can definitely determine the approximate position across a plurality of steering shaft revolutions.

Thereby, it is preferred that a first toothing is provided which faces outwardly and runs circumferentially around the steering shaft axis of rotation, which is coupled to the steering shaft in a torsion-proof manner, and a second gear is provided, which is pivot-mounted around a second gear axis, with a second toothing is provided, which faces outwardly and runs circumferentially around the second gear axis, wherein the second gear axis is arranged in parallel to and spaced away from the steering shaft axis of rotation and the first toothing and the second toothing mesh with one another.

Furthermore, it is preferred if a third gear is provided that is pivot-mounted around a third gear axis with a third toothing facing outwardly and running circumferentially around the third gear axis, wherein the third gear axis is arranged in parallel to and spaced away from the steering shaft axis of rotation and arranged in parallel to and spaced away from the second gear axis.

Preferably, for easy magnetic detection of the angle of rotation, a magnetic substrate is provided that is connected to the third gear in a torsion-proof manner or integrally forms the third gear, wherein its rotational position can be detected by means of a sensor element. A gearing transmission is represented by the combination of gears with each other so that, preferably, the magnetic substrate or simply the magnet rotates more slowly than the rotation of the steering shaft rotation to be detected. In particular, the substrate or the magnet can only turn a maximum of 360° although the steering shaft carries out a plurality of revolutions, for example, four revolutions.

In order to represent the gearing transmission, in particular, reduction into a slower revolution, the third gear is preferably partially accommodated within the second gear and pivot-mounted around the third gear axis.

In order to simply illustrate an eccentric gearing, a fourth gear can be provided that has a fourth toothing that faces inwardly and runs circumferentially around the second gear axis and the third gear axis, which meshes with the third toothing.

In particular, the fourth toothing is advantageously arranged in its rotational position with reference to the steering shaft axis and the second gear axis and the third gear axis in a resting and unmovable manner.

In particular, the determination of the highly accurate angle of rotation Xt with the aforementioned four toothings can synonymously take place with a maximum of four gears, wherein, additionally, the coupling of the rotation of the rotor into the power steering system is contained in the system.

Advantageously, the construction is suitable to integrally represent the steering angle sensor unit with a torque sensor unit to determine the torque of the steering shaft introduced into the steering shaft by a driver in an integral construction unit. By means of this, the mechanical and electrical couplings are combined and the entire system on a constructional level is simplified.

Furthermore, the object of the invention is solved by a method for determining a highly accurate absolute angle of rotation Xt of the rotational position of a pivot-mounted steering shaft, wherein the rotation of a rotor of an electric motor is coupled into the rotation of the steering shaft by means of a gearing having a gearing transmission factor K for power assistance, wherein in the method, the rotational position of the rotation of the rotor is measured by means of a rotor position sensor and, with the use of the number of revolutions of the rotor that have occurred, this value is used directly to determine the highly accurate absolute angle of rotation of the steering shaft. During the normal measurement during operation of the motor vehicle, the steering angle sensor unit is not used to determine the highly accurate absolute angle of rotation accordingly. The steering angle sensor unit is used to calibrate initial values and to determine the initial rotational position. Furthermore, the steering angle sensor unit can be used as a fall-back level in the case of malfunction and/or to detect possible errors in the measurement.

In particular, the method for determining a highly accurate absolute angle of rotation Xt of the rotational position of a pivot-mounted steering shaft comprises the following steps:
a) Measuring a rotor angle Yt of the rotational position of the rotor with a rotor position sensor;
b) Reading of a stored current revolution numerical value N of the rotor with reference to an initial value of the rotor angle Yk0 with a corresponding initial value of the angle of rotation Xk0, wherein the values have been determined within the scope of a calibration process;
c) Calculation of the highly accurate absolute value of the angle of rotation Xt of the steering shaft according to the equation:

$$Xt = Xk0 + (Yt - Yk0)/K + N*360°/K.$$

As an alternative, the object can also be solved by means of a method for determining a highly accurate absolute angle of rotation of the rotational position of a pivot-mounted steering shaft, wherein the rotation of a rotor of an electric motor with a gearing with a gearing transmission factor K for power assistance is coupled into the rotation of the steering shaft into the rotation of the steering shaft, wherein the method comprises the following steps:
a) Measuring a rotor angle Yt of the rotational position of the rotor with a rotor position sensor;
b) Measurement of the angle of rotation Xt1 of the absolute rotational position of the steering shaft using a steering angle sensor unit, wherein the angle of rotation Xt1 is detected with a gearing with a transmission factor UF;
c) Selection of an amount of predetermined calibration datasets (measurement tuples), respectively comprising a measured angle of rotation Xk and a related measured rotor angle Yk, a calibration dataset Xk1, Yk1 closest to the current measured value of the angle of rotation Xt1;
d) Determination of the number of revolutions N1 of the rotor, which have taken place in order to arrive from the angle of rotation of the steering shaft from the calibration dataset Xk1 to the current measured angle of rotation Xt1 of the steering shaft;
e) Calculation of the highly accurate absolute value of the angle of rotation of the steering shaft according to the equation:

$$Xt = Xk1 + ((Xt1 - Xk1)/(|Xt1 - Xk1|)*(|Yt - Yk1|)/K) + N1*360°/K.$$

Preferably, according to the calibration process shown below, so many calibration datasets are determined that the number of revolutions N1 always has the value 0 (=zero). That means that for each 360° revolution of the rotor, one, preferably exactly a single, calibration dataset is determined.

However, if only a single calibration data set is determined, both solution methods merge into one another.

The method for determining a highly accurate absolute angle of rotation can also be further developed to the extent that the direction of rotation is also taken into consideration in addition to the angle of the rotor. Accordingly, there are separate calibration datasets for each rotational direction.

Hysteresis in the transmission components can be compensated for in this way and the accuracy further increased.

Important advantages of the method are seen in that inaccuracies in the gearing of the steering angle sensor system hardly have any influence on the measurement results achieved. Accordingly, the gearing of the steering wheel sensor system can be inexpensive.

The calibration for determining calibration datasets can take place using a method for calibrating a measurement device for measuring a highly accurate absolute angle of rotation Xt of the rotational position of a pivot-mounted steering shaft, wherein the rotation of a rotor of an electric motor with a gearing with a gearing transmission factor K for power assistance is coupled into the rotation of the steering shaft, wherein the method comprises the following steps:
a) Powering the electric motor to shift the rotational position of the steering shaft into a first direction;
b) Continuous measuring of a rotor angle Yt of the rotational position of the rotor with a rotor position sensor with a detection interval;
c) Continuous measuring of the angle of rotation Xt1 of the absolute rotational position of the steering shaft by means of a steering angle sensor unit, wherein the angle of rotation Xt1 is detected with a gearing with a transmission factor UF and wherein the detection takes place at the mentioned detection interval;
d) In the case of the angle of rotation Xt1 changing in relation to the value measured at the detection point directly beforehand, saving the measurement value pair from the rotor angle Xt1$ia$, Yi$a$;
e) Powering the electric motor to shift the rotational position of the steering shaft into a second direction;
f) Continuous measuring of a rotor angle Yt of the rotational position of the rotor by means of a rotor position sensor at the aforementioned detection interval;
g) Continuous measuring of the angle of rotation Xt1 of the absolute rotational position of the steering shaft by means of a steering angle sensor unit, wherein the angle of rotation Xt1 is detected with a gearing with a transmission factor UF;

h) In the case of the angle of rotation Xt1 changing in relation to the value measured at the detection point directly beforehand, saving the measurement value pair from the rotor angle Xt1*ib*, Yib;

i) Formation of a measurement tuple comprising an absolute angle of rotation of the steering shaft Xk0 as an average of both measured angles of rotation Xt1*a* and Xt1*b*, and a rotor angle Yk0 as an average of both measured rotor angles Ya and Yb;

j) Saving of the measurement tuple Xk0, Yk0 as a calibration dataset on a storage means and saving the value zero (=0) as a current revolution numerical value N into a memory unit.

In order to determine further calibration datasets, it can be provided that, after saving a first measurement tuple Xk0, Yk0, the following further steps are carried out a single time or several times:

a) Re-powering the electric motor to shift the rotational position of the steering shaft into a first direction;

b) Continuous measuring of a rotor angle Yt of the rotational position of the rotor by means of a rotor position sensor;

c) Continuous measuring of the angle of rotation Xt1 of the absolute rotational position of the steering shaft by means of a steering angle sensor unit, wherein the angle of rotation Xt1 is detected with a gearing with a transmission factor UF;

d) Upon reaching a predefined differential angle, saving the measurement value pair from the rotor angle Xt1*ia*, Yia;

e) Powering the electric motor to shift the rotational position of the steering shaft into a second direction;

f) Continuous measuring of a rotor angle Yt of the rotational position of the rotor by means of a rotor position sensor;

g) Continuous measuring of the angle of rotation Xt1 of the absolute rotational position of the steering shaft by means of a steering angle sensor unit, wherein the angle of rotation Xt1 is detected with a gearing with a transmission factor UF;

h) In the case of the angle of rotation Xt1 changing in relation to the value measured directly beforehand, saving the measurement value pair from the rotor angle Xt1*ib*, Yib;

i) Formation of a measurement tuple comprising the absolute angle of rotation of the steering shaft Xk as an average of both measured angles of rotation Xt1*a* and Xt1*b*, and a rotor angle Yk as an average of both measured rotor angles Ya and Yb;

j) Saving the measurement tuple Xk, Yk as a calibration dataset onto a storage means.

In order to use the method for measuring a highly accurate absolute angle of rotation, where the rotational direction is used, the calibration can be carried out using a method that comprises the following steps:

a) Powering the electric motor to shift the rotational position of the steering shaft into a first rotational direction;

b) Continuous measuring of a rotor angle Yt of the rotational position of the rotor with a rotor position sensor with a detection interval;

c) Continuous measuring of the angle of rotation Xt1 of the absolute rotational position of the steering shaft by means of a steering angle sensor unit, wherein the angle of rotation Xt1 is detected with a gearing with a transmission factor UF and wherein the detection takes place at the mentioned detection interval;

d) When changing the angle of rotation Xt1 in relation to the value measured at the detection point directly beforehand, saving the measurement value pair from the rotor angle Xt1*ia*, Yia as a first calibration dataset for the first rotational direction;

e) Saving of the value zero (=0) as a current revolution numerical value Na into a memory unit to the related first calibration dataset for the first rotational direction;

f) Powering the electric motor to shift the rotational position of the steering shaft into a second rotational direction;

g) Continuous measuring of a rotor angle (Yt) of the rotational position of the rotor by means of a rotor position sensor at the aforementioned detection interval;

h) Continuous measuring of the angle of rotation Xt1 of the absolute rotational position of the steering shaft by means of a steering angle sensor unit, wherein the angle of rotation Xt1 is detected with a gearing with a transmission factor UF;

i) In the case of the angle of rotation Xt1 changing in relation to the value measured at the detection point directly beforehand, saving the measurement value pair from the rotor angle Xt1*ib*, Yib as a first calibration dataset for the second rotational direction;

j) Saving the value zero (=0) as a current revolution numerical value Nb into a memory unit to the related second calibration dataset for the second rotational direction.

In order to determine the current revolution number of the rotor, a method for calibrating a measurement device can be used, which comprises the following steps:

a) Continuous measuring of the rotor angle Yt with the aforementioned detection interval;

b) When the rotor angle Yt grows by an amount of more than 80° from one time step of the detection interval to the next time step, the saved revolution numerical value is increased by one count and saved as a current revolution numerical value N;

c) When the rotor angle Yt declines by an amount of more than +80° from one time step of the detection interval to the next time step, the saved revolution numerical value is decreased by one count and saved as a current revolution numerical value N.

The leap |ΔYt|, as of which the revolution numerical value N is changed by one, is determined from the maximum possible steering speed and the detection frequency. However, values of 90° or alternatively 120° are preferably used as a leap factors. The leap of the rotor angle, which is used to change the revolution numerical value N should however be smaller than 290°, preferably smaller than 200°. In the case of a maximum steering speed of 3000°/second, a steering angle change and a detection frequency of 1 kHz, a steering angle change of 3° would be possible from one detection step to the next detection step. This corresponds to a leap of 66° at a transmission K of 22 rotor revolutions to a single steering shaft revolution. In the case of lower maximum possible steering speeds or other transmissions K, other values must be used accordingly.

FIGS. 1 to 4 show an electromagnetic power steering system 1 of a motor vehicle with an electric motor 2, which supports the steering movement of a driver on a steering column. For support, the rotor of the electric motor is coupled into the rotation of the steering shaft 300 over a gearing 6, in the example a worm gearing. The steering shaft 300 has an upper steering shaft 3 and a lower steering shaft 4, that are connected to each other via a torsion rod 5 and are pivot-mounted around a steering shaft axis 301. The upper steering shaft 3 is directly connected to a steering wheel (not shown) in a torsion-proof manner. The electric motor 2 drives the lower steering shaft 4 via a gearing 6, which is connected to a steering rack steering gear (not shown). The electric motor 2 has a rotor position sensor (RPS) 7. In addition, an integral construction unit 8 is provided with a torque sensor unit 9 and a steering angle sensor unit 10. The torque sensor unit 9 detects the torsion of the upper steering shaft 3 in relation to the lower steering shaft 4 as a measurement of the torque manually exerted on the upper steering shaft 3. In contrast, the steering angle sensor unit 10 measures the current steering angle of the lower steering shaft 3.

The torque sensor unit 9 has a ring magnet 11 (permanent magnet) and a magnetic-flux conductor 12 connected to the upper steering shaft 3 in a torsion-proof manner. A corresponding sensor unit 13 is connected to the unit of the electric motor 2 in a spatially fixed manner.

Figures 1, 2:
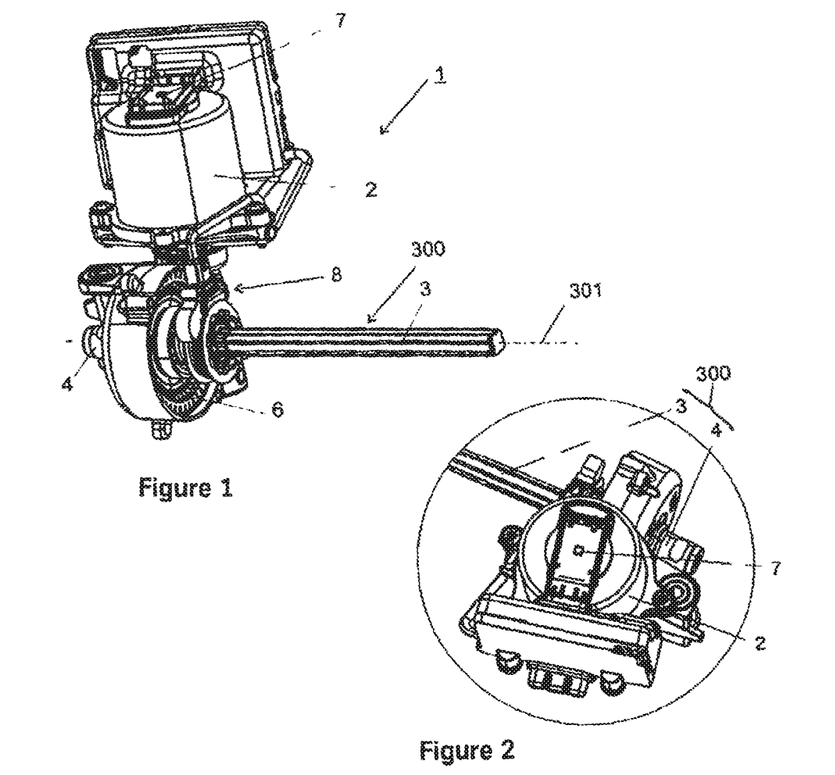
FIG. 1 is a spatial view of an example electromechanical power steering system with an electric motor, a torque sensor, and a steering angle sensor.
FIG. 2 is a perspective view of the example electromechanical power steering system of FIG. 1 from above showing the electric motor with a rotor position sensor.
Figure 3:
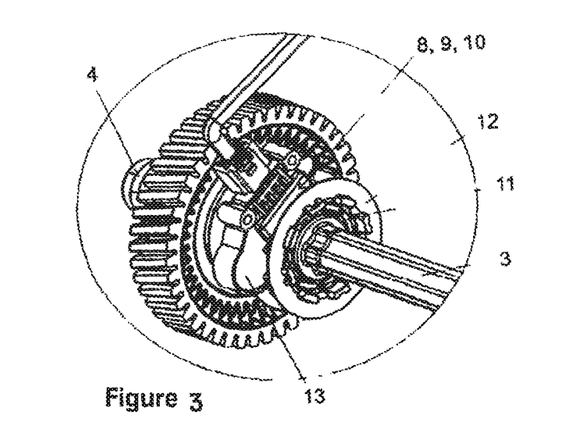
FIG. 3 is a detail view of an example integral construction unit of a torque sensor and of a steering angle sensor.
Figure 4:
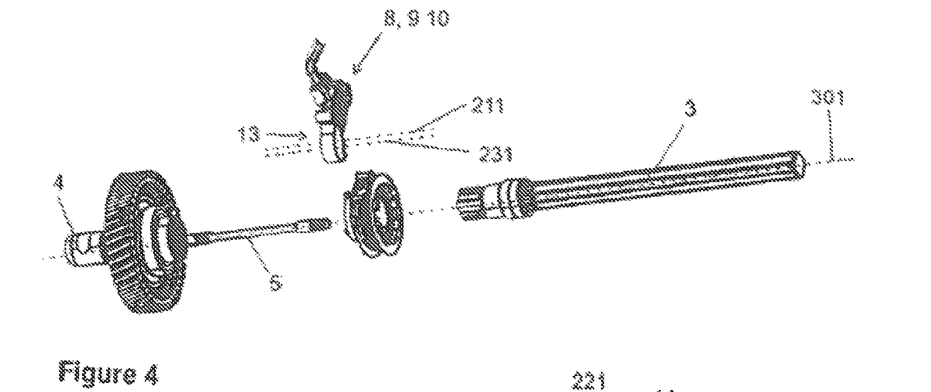
FIG. 4 is an exploded view of an example integral construction unit on a steering shaft.
Figure 5:
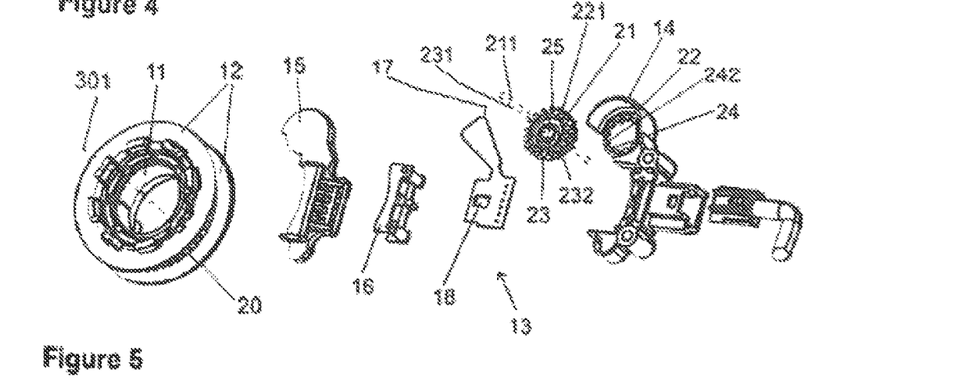
FIG. 5 is an exploded view of an example integral construction unit of a first side.
Figure 6:
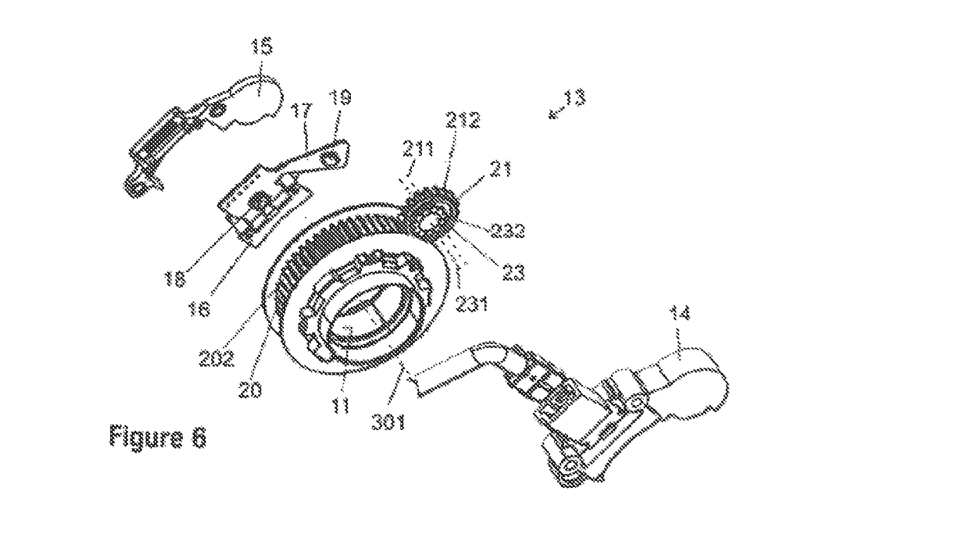
FIG. 6 is an exploded view of an example integral construction unit of a second side.

In FIGS. 4 to 6, the construction of the integral construction unit 8 is shown in detail. The sensor unit 13 has a housing 14 with a housing cover 15 and a magnetic-flux conductor 16 arranged therein and a magnet sensor 18 arranged on a printed circuit board 17. The flux conductors 12, 16 serve to concentrate the magnetic flow at the magnet sensor 18.

The magnet sensor 18 detects the torsion of the shaft 3 connected to the ring magnet 11 with relation to the lower shaft 4 connected to the magnetic-flux conductor 12.

In addition to the magnet sensor 18 of the torque sensor unit 9, a sensor element 19 of the steering angle sensor unit 10 is also provided on the printed circuit board 17.

The ring magnet 11 is surrounded along its circumference by a first gear 20 with a first toothing 202 facing outwardly, which is part of the steering angle sensor unit 10. This toothing is arranged concentrically to the steering shaft axis 301 and coupled to the lower steering shaft 4 in a torsion-proof manner. A second circumferential second toothing 212 of a second gear 21 facing outwardly meshes into this first toothing 202 of the first gear 20 that rolls off the first gear 20 and is pivot-mounted in a holder of the housing 14 around a second gear axis 211. The second gear axis 211 is arranged in parallel and offset to the steering shaft axis 301. In turn, a third gear 23 is eccentrically pivoted around a third gear axis 231 within the second gear 21. The third gear axis 231 is accordingly arranged in parallel and offset to the second gear axis 211 and to the steering shaft axis 301. The third gear has a circumferential third toothing 232 facing outwardly. A fourth circumferential toothing 242 facing inwardly of a fourth gear 24 is arranged within the holder 22 within the housing 14 and meshes with the third toothing 232 so that this third toothing 232 rolls along this fourth toothing 242. The gears 20, 21, 23 form a spur gearing, wherein all axes of rotation 301, 201, 211, 231 are arranged in parallel to each other and offset to each other.

Thereby, the rotational movement of the upper steering shaft 3 is transmitted to the third gear 23 via the gearing, in which a permanent magnet is arranged, made of a magnetic substrate 25. The rotation of the third gear 23 is then detected by means of the sensor element 19 on the printed circuit board 17. As an alternative to using a separate permanent magnet, the magnetic substrate 25 can be integrated into the third gear 23 or even form the entire third gear.

The sensor element 19 of the steering angle sensor unit 10 is preferably a hall sensor, which is arranged in a resting manner opposite to the permanent magnet and the magnetic substrate 25 of the third gear 23.

In this exemplary embodiment, the steering angle sensor can clearly detect a range of four revolutions of the steering shaft, in particular of the lower steering shaft 4. In addition, a transmission factor UF is provided from of 4:1 from the first gear, meaning the lower steering shaft 4, to the encoder gearing element. While the lower steering shaft 4 completes four revolutions, the third gear only rotates the encoder gearing element of the spur gearing a single time. In the embodiment shown here, the gearing transmission is implemented with a single tooth difference between the inner toothing of the holder and the encoder gearing element. Thereby, an absolute angle of rotation Xt1 (c.f. signal 27 in FIGS. 7, 8, 9) of the rotational position of the lower steering shaft 4 can even be determined over a plurality of revolutions of the lower steering shaft 4. Since the upper steering shaft 3 is connected to the lower steering shaft 4 via a torsionally flexible torsion rod 5 and only a small torsion angle is permitted between both steering shafts 3, 4 against each other, thereby, the rotational position of the upper steering shaft 3 is also determined, so to say.

However it is also conceivable and possible to arrange the gearing so that the rotational position of the upper steering shaft 3 is detected directly. In addition, only the first toothing must be directly coupled to the upper steering shaft 3 in a torsion-proof manner. In principle, the steering angle sensor is simply installed in reverse from the upper part to the lower part. However, this is not be preferred.

The calibration for determining the "zero position" or another initial value takes place mechanically when mounting on the one hand and on the other hand, by determining a corresponding initial value within the electronic evaluation unit.

By means of coupling the gearing of the electric motor into the steering system with the gearing 6, the rotational position of the steering shaft is linked directly to the rotational position of the rotor of the electric motor. Thereby, a gearing transmission factor K from the rotation of the lower steering shaft 4 to the rotation of the rotor is in the example of 1:20. Accordingly, the rotor angle Yt is coupled with the steering angle Xt at a ratio of 20:1. Accordingly accurately, the rotational position of the rotor can reflect the rotational position of the lower steering shaft 4. However, there are multiple revolutions so that the system must always "know" how high the current revolution numerical value N is. Here, the absolute angle of rotation Xt1 of the lower steering shaft 4 determined using the steering angle sensor unit 10 can be used for calibration.

In order to regulate the electromechanical power steering, it is already usual in the prior art to determine the rotational position of the rotor using a rotor position sensor. This is required in order to control the electric motor in a precise manner. In addition, a precise determination of the rotational position of the rotor is portrayed. Accordingly, the highly accurate absolute angle Xt of the lower steering shaft 4, which is determined using the rotor position sensor RPS, is determined much more precisely than the absolute angle Xt1 of the lower steering shaft 4, which is determined by means of the steering angle sensor unit 10.

During ongoing operation, after initial calibration, evaluating the measurement values of the steering angle sensor unit 10 can be dispensed with. However, the calibrated values must be stored in an appropriate storage system 29

(cf. FIGS. 10 to 13). By means of this, the calculation time and the calculation effort as well as the required power requirements are reduced.

Various calibration methods are conceivable and possible.

Figure 7:
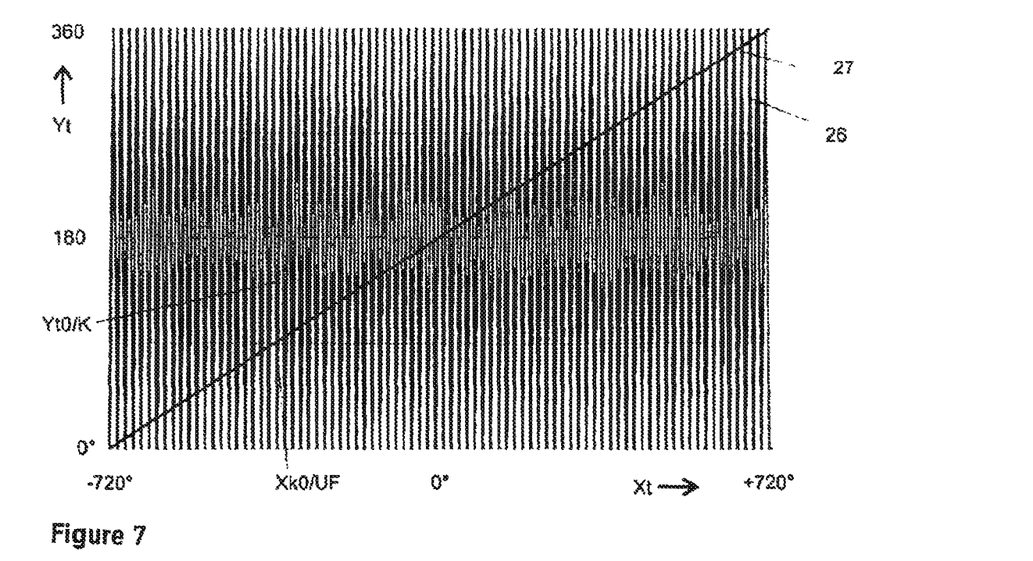
FIG. 7 is a diagram depicting sensor signals corresponding to courses of the angles and revolutions.
Figure 8:
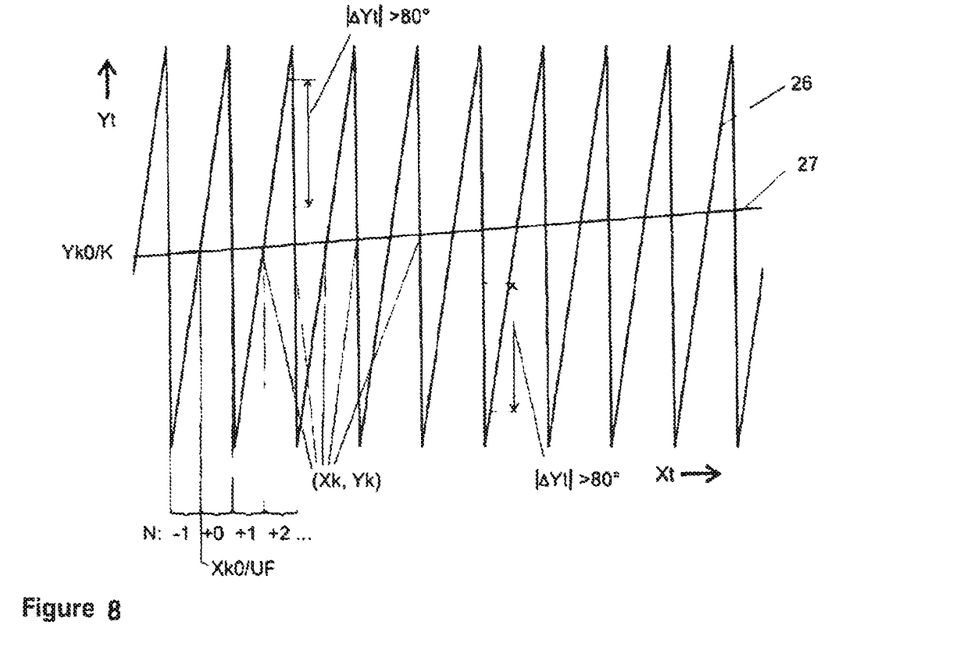
FIG. 8 is an enlarged view of the diagram of FIG. 7.
Figure 9:
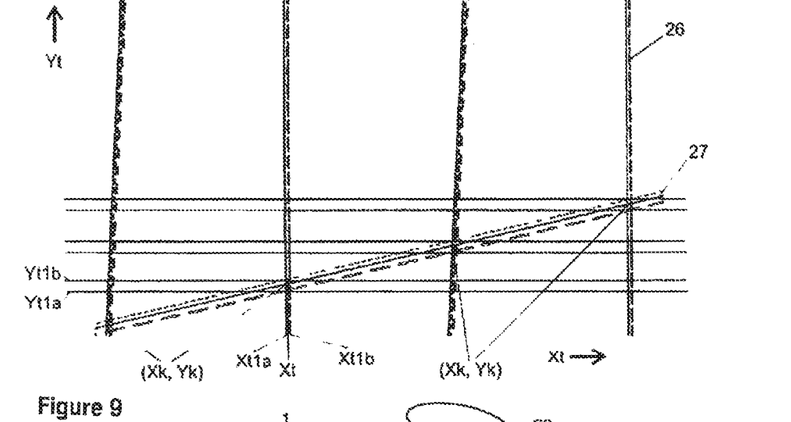

Using FIGS. 7, 8 and 9, the measurement method and various calibration methods are further explained.

In FIGS. 7, 8 and 9, the measured angle Yt of the rotor can be applied as a signal 26 and the measured angle Xt1 of the steering angle sensor can be applied as a signal 27 against the highly accurate absolute angle of steering Xt. In FIG. 9, measurement deviations depending on the direction of the rotation are shown. Thereby, both tolerances in the gearing as well as play or other hysteresis effects can be seen as causes for the deviations of the values for the rotor angle Yt1$a$ in comparison to Yt1$b$ or for the steering angle Xt1$a$ in comparison to Xt1$b$. As is illustrated in FIG. 9, great deviations in the rotor position have only slight effects on the determination of the steering shaft position.

The actual measurement or determination of the highly accurate absolute angle of rotation Xt of the lower steering shaft 4 comprises the following steps:
- d) Measuring a rotor angle Yt of the rotational position of the rotor by means of a rotor position sensor 7;
- e) Reading a stored current revolution numerical value N of the rotor with reference to an initial value of the rotor angle Yk0 with a corresponding initial value of the angle of rotation Xk0, wherein the values have been determined within the scope of a calibration process;
- f) Calculation of the highly accurate absolute value of the angle of rotation Xt of the lower steering shaft 4 according to the equation:

$$Xt=Xk0+(Yt-Yk0)/K+N*360°/K.$$

As an alternative, the measurement method can comprise the following steps:
- a) Measuring the rotor angle Yt of the rotational position of the rotor with the rotor position sensor 7;
- b) Measurement of the angle of rotation Xt1 of the absolute rotational position of the lower steering shaft 4 using a steering angle sensor unit 10, wherein the angle of rotation Xt1 is detected with a gearing with a transmission factor UF;
- c) Selection of an amount of predetermined calibration datasets (measurement tuples), respectively comprising a measured angle of rotation Xk and a related measured rotor angle Yk, a calibration dataset (Xk1, Yk1) closest to the currently measured value of the angle of rotation Xt1;
- d) Determination of the number of revolutions N1 of the rotor, which have taken place in order to arrive from the angle of rotation of the steering shaft from the calibration dataset Xk1 to the currently measured angle of rotation Xt1 of the steering shaft;
- e) Calculation of the highly accurate absolute value of the angle of rotation of the steering shaft according to the equation:

$$Xt=Xk1+((Xt1-Xk1)/(|Xt1-Xk1|)*(|Yt-Yk1|)/K)+N1*360°/K.$$

Preferably, according to the calibration process shown below, enough calibration data sets are determined so the number N1 of revolutions always has the value 0. That means that for each 360° revolution of the rotor, preferably, exactly a single calibration dataset is determined.

However, if only a single calibration dated set is determined, both solution methods merge into one another.

If the method for determining a highly accurate absolute angle of rotation is further developed to the extent that the direction of rotation is also taken into consideration in addition to the angle of the rotor, separate calibration datasets will be determined for each rotational direction.

Calibration to determine calibration datasets can comprise the following steps:
- a) Powering the electric motor 2 to shift the rotational position of the lower steering shaft 4, and thereby the entire steering shaft 300, into a first direction;
- b) Continuous measuring of a rotor angle Yt of the rotational position of the rotor by means of a rotor position sensor 7 at a detection interval;
- c) Continuous measuring of the angle of rotation Xt1 of the absolute rotational position of the lower steering shaft 4 using a steering angle sensor unit 10, wherein the angle of rotation Xt1 is detected with a gearing with a transmission factor UF and wherein the detection takes place at the mentioned detection interval;
- d) In the case of the angle of rotation Xt1 changing in relation to the value measured at the detection point directly beforehand, saving the measurement value pair from the rotor angle Xt1$ia$, Yi$a$;
- e) Powering the electric motor 2 to shift the rotational position of the lower steering shaft 4 into a second direction;
- f) Continuous measuring of a rotor angle Yt of the rotational position of the rotor with a rotor position sensor 7 with the aforementioned detection interval;
- g) Continuous measuring of the angle of rotation Xt1 of the absolute rotational position of the lower steering shaft 4 using a steering angle sensor unit 10, wherein the angle of rotation Xt1 is detected with a gearing with a transmission factor UF;
- h) In the case of the angle of rotation Xt1 changing in relation to the value measured at the detection point directly beforehand, saving the measurement value pair from the rotor angle Xt1$ib$, Yi$b$;
- i) Formation of a measurement tuple comprising an absolute angle of rotation of the lower steering shaft Xk0 as an average of both measured angles of rotation Xt1$a$ and Xt1$b$, and a rotor angle Yk0 as an average of both measured rotor angles Ya and Yb;
- j) Saving of the measurement tuple Xk0, Yk0 as a calibration dataset on a storage medium 29 (c.f. FIGS. 10 to 13) and saving of the value zero (0) as the current revolution numerical value N into a memory unit.

In order to determine further calibration datasets, it can be provided that, after saving a first measurement tuple (Xk0, Yk0), the following further steps are carried out a single time or several times:
- a) Re-powering the electric motor 2 to shift the rotational position of the lower steering shaft 4 into a first direction;
- b) Continuous measuring of a rotor angle Yt of the rotational position of the rotor with a rotor position sensor 7;
- c) Continuous measuring of the angle of rotation Xt1 of the absolute rotational position of the lower steering shaft 4 using a steering angle sensor unit 10, wherein the angle of rotation Xt1 is detected with a gearing with a transmission factor UF;
- d) Upon reaching a predefined differential angle: Saving the measurement values pair from the rotor angle Xt1$ia$, Yi$a$;
- e) Powering the electric motor 2 to shift the rotational position of the lower steering shaft 4 into a second direction;

f) Continuous measuring of a rotor angle Yt of the rotational position of the rotor with a rotor position sensor 7;
g) Continuous measuring of the angle of rotation Xt1 of the absolute rotational position of the lower steering shaft 4 using a steering angle sensor unit 10, wherein the angle of rotation Xt1 is detected with a gearing with a transmission factor UF;
h) When changing the angle of rotation Xt1 in relation to the value immediately measured beforehand: Saving the measurement value pair from the rotor angle Xt1*ib*, Yib;
i) Formation of a measurement tuple comprising an absolute angle of rotation of the steering shaft Xk as an average of both measured angles of rotation Xt1*a* and Xt1*b*, and a rotor angle Yk as an average of both measured rotor angles Ya and Yb;
j) Saving the measurement tuple, Xk, Yk as a calibration dataset onto a storage means 29.

In order to use the method to measure a highly accurate absolute angle of rotation, where the rotational direction is used, the calibration can be carried out using a method that comprises the following steps:
a) Powering the electric motor 2 to shift the rotational position of the lower steering shaft 4 into a first rotational direction;
b) Continuous measuring of a rotor angle Yt of the rotational position of the rotor by means of a rotor position sensor 7 at a detection interval;
c) Continuous measuring of the angle of rotation Xt1 of the absolute rotational position of the lower steering shaft 4 using the steering angle sensor unit 10, wherein the angle of rotation Xt1 is detected with a gearing with a transmission factor UF and wherein the detection takes place at the mentioned detection interval;
d) When changing the angle of rotation Xt1 in relation to the value measured at the detection point directly beforehand, saving the measurement value pair from the rotor angle Xt1*ia*, Yia as a first calibration dataset for the first rotational direction;
e) Saving of the value zero (0) as a current revolution numerical value Na into a memory unit to the related first calibration dataset for the first rotational direction;
f) Powering the electric motor 2 to shift the rotational position of the lower steering shaft 4 into a second rotational direction;
g) Continuous measuring of a rotor angle Yt of the rotational position of the rotor with a rotor position sensor 7 with the aforementioned detection interval;
h) Continuous measuring of the angle of rotation Xt1 of the absolute rotational position of the lower steering shaft 4 using the steering angle sensor unit 10, wherein the angle of rotation Xt1 is detected with a gearing with a transmission factor UF;
i) When changing the angle of rotation Xt1 in relation to the value measured at the detection point directly beforehand, saving the measurement value pair from the rotor angle Xt1*ib*, Yib as a first calibration dataset for the second rotational direction;
j) Saving the value zero (0) as a current revolution numerical value Nb into a memory unit to the related second calibration dataset for the second rotational direction.

The possibility to determine the revolution numerical N is shown in FIG. 8. When the rotor angle Yt grows by an amount |ΔYt| of more than 80° from one time step of the detection interval to the next time step, the saved revolution numerical value is increased by one count (N=N+1) and saved as a current revolution numerical value N. When the rotor angle Xt declines by an amount |ΔYt| of more than +80° from one time step of the detection interval to the next time step, the saved revolution numerical value is decreased by one count (N=N−1) and saved as a current revolution numerical value N. As can be seen from the example, the leap |ΔYt| can generally be considerably greater than 80°.

In FIGS. 10 to 13, various embodiments of the steering system are shown.

A steering movement introduced into the upper steering shaft 3 by a driver via a steering wheel 50 is transmitted into the lower steering shaft 4 via the torsion rod 5. Thereby, at least the absolute angle of rotation Xt1 of the lower steering shaft 4 in the steering angle sensor unit 10 is determined and transmitted to the evaluation unit 28. A power supply 31 is connected via the ignition switch 30 with the control system of the evaluation unit 28 in a switchable manner. The servo unit 40 with the electric motor 2 is controlled by the control system in such a way that the steering movement of the driver is supported, wherein the steering rack 32 is moved in a linear manner and support for the swiveling of the wheels takes place.

At least the measured rotor angle Yt is added to the control system.

Means 29 serve for saving calibration data as well as calibration datasets Xk1, Yk1 or the measurement tuple Yk, Yk and/or the current revolution numerical value N.

In an adder 281, the corresponding adding or subtraction tasks are carried out.

Figures 10, 11:
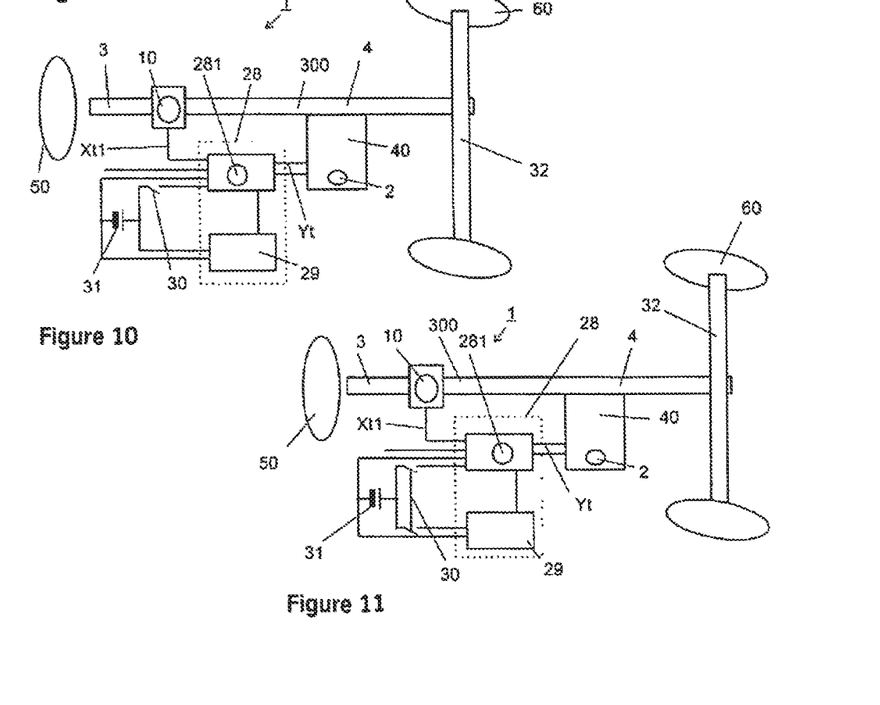
FIG. 10 is a schematic view of an example electromagnetic power steering with a servo support on a steering column and a memory, which is supplied with onboard voltage when an ignition is switched off.
FIG. 11 is a schematic view of another example electromagnetic power steering with servo support and memory.
Figure 12:
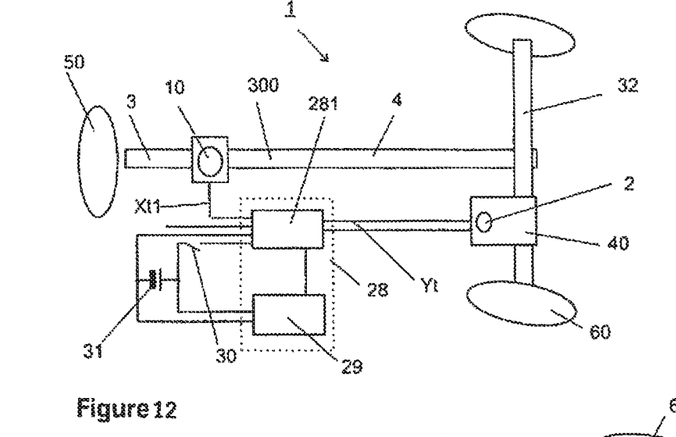
FIG. 12 is a schematic view of still another example electromagnetic power steering with servo support on a steering rack and a memory, which is also supplied with onboard voltage when an ignition is switched off.

The steering system according to the invention can have means 29, which are supplied with electricity in an uninterrupted manner, as is shown in FIGS. 10 and 12. In this case, the calibration data are always available. However, power is always consumed.

Figure 13:
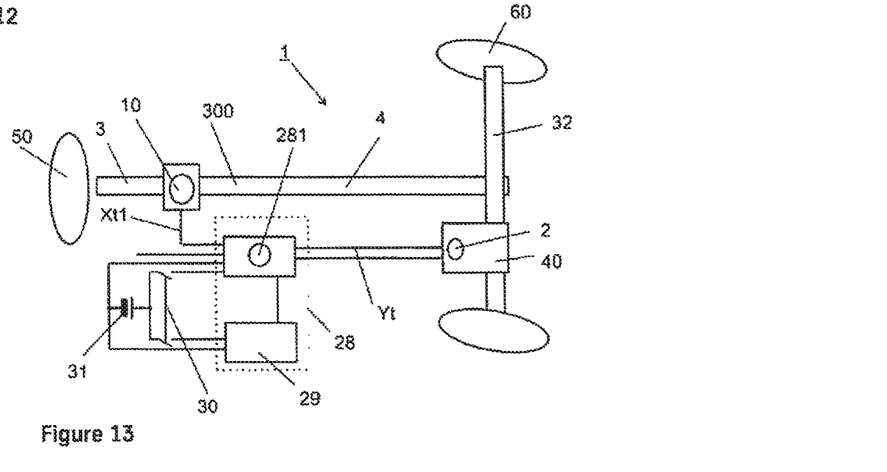
FIG. 13 is a schematic view of yet another example electromagnetic power steering with servo support on a steering rack and memory.

As an alternative, the steering system according to the invention can have means 29, which are only temporarily supplied with power when the ignition is switched on, as is shown in FIGS. 11 and 13. In this case, the calibration data are not always available. Depending on the design, the data can be lost every time the ignition is switched off or only after a certain period of time. However, the advantage lies in the lower idling power consumption.

Each time, in this case, a calibration procedure must be restarted. If the system is started (for example, the ignition is switched on), a brief propulsion of the electric motor takes place in order to cause a small turn (a few degrees) of the steering shaft, wherein at least one tuple, preferably two of the Xk, Yk measurement tuples are gone over and saved so that the highly accurate absolute steering angle can be directly derived again.

Especially advantageously, using a measurement of the angle of rotation Xt of the steering shaft when the ignition is switched off can be dispensed with. A corresponding sleep mode is not required. Due to the very simple and very quick method to calibrate the measurement system, every time the ignition is started, the calibration immediately takes place so that a highly accurate absolute angle of rotation measurement of the steering angle is already available after a few driven meters (less than 10 m) at the latest. The calibration procedure can also be directly carried out within a few seconds (less than 10 s) in a stationary position.

According to FIGS. 10 and 11, the gearing to represent the servo support, as is shown in FIGS. 1 to 4, is designed as a worm gearing.

As an alternative, as is shown in FIGS. 12 and 13, the steering rack 32 can also be directly powered so that the gearing can be designed as a ball screw drive, for example.

The determination of the absolute angle of rotation according to the invention can be used in all types of electromechanical power steering. Thereby, the arrangement of the steering angle sensor unit is not limited to the integral form along with the torque sensor unit, rather this is a preferred embodiment.

The system according to the invention for determining the highly accurate absolute angle of steering of a steering shaft within an electromechanical power steering system is particularly simple and inexpensive with regard to its construction due to the narrow-ranged diversity of parts and can be very simply and accurately calibrated by utilizing the rotor position signal.

What is claimed is:

1. An electromechanical power steering system comprising:
    a steering shaft that is pivot-mounted around a steering shaft axis of rotation and is movable between a plurality of rotational positions;
    an electric motor that includes
        a rotor, wherein rotation of the rotor is coupled into the electromechanical power steering system, and
        a rotor position sensor for measuring a rotor angle Yt of the rotor;
    a steering angle sensor unit for measurement of a first absolute angle of rotation Xt1 of a rotational position of the steering shaft relative to a predefined output rotational position; and
    an evaluation unit for combining the rotor angle Yt with the first absolute angle of rotation Xt1 to determine a second absolute angle of rotation Xt of the rotational position of the steering shaft, the evaluation unit comprising
        means for storing at least two measurement tuples, wherein each of the at least two measurement tuples comprises an angle value of a rotor angle Yk and an angle value of a related absolute angle of rotation Xk of the rotational position of the steering shaft, and
        an adder for determining the second absolute angle of rotation Xt of the rotational position of the steering shaft based on one of the at least two measurement tuples that have been stored by adding or subtracting the rotor angle Yt.

2. The electromechanical power steering system of claim 1 comprising:
    a first toothing of a first gear, wherein the first toothing faces outwardly and runs circumferentially around the steering shaft axis of rotation, the first toothing being coupled to the steering shaft in a torsion-proof manner; and
    a second gear that is pivot-mounted around a second gear axis, the second gear including a second toothing that faces outwardly and runs circumferentially around the second gear axis, wherein the second gear axis is disposed in parallel to and spaced apart from the steering shaft axis of rotation, wherein the first toothing meshes with the second toothing.

3. The electromechanical power steering system of claim 2 comprising a third gear that is pivot-mounted around a third gear axis with a third toothing facing outwardly and running circumferentially around the third gear axis, wherein the third gear axis is parallel to and spaced apart from the steering shaft axis of rotation and parallel to and spaced apart from the second gear axis.

4. The electromechanical power steering system of claim 3 comprising a magnetic substrate that is either connected to the third gear in a torsion-proof manner or integrally forms the third gear, wherein a rotational position of the magnetic substrate is detectable by way of a sensor.

5. The electromechanical power steering system of claim 3 wherein the third gear is partially accommodated within the second gear.

6. The electromechanical power steering system of claim 3 comprising a fourth toothing disposed in a rotational position in a resting and unmovable manner relative to the steering shaft axis, the second gear axis, and the third gear axis.

7. The electromechanical power steering system of claim 6 wherein the first, second, third and fourth gears and the coupling of the rotation of the rotor into the electromechanical power steering system are contained in the electromechanical power steering system as a maximum to determine the second absolute angle of rotation Xt.

8. The electromechanical power steering system of claim 1 wherein the steering angle sensor unit comprises a torque sensor unit to determine a torque of the steering shaft introduced into the steering shaft by a driver in an integral construction unit.

9. A method for calibrating a measurement device for measuring a second absolute angle of rotation Xt of a rotational position of a rotatably supported steering shaft, wherein rotation of a rotor of an electric motor with a gearing with a gearing transmission factor K for power assistance is coupled into rotation of the rotatably supported steering shaft, the method comprising:
    powering the electric motor to shift the rotational position of the rotatably supported steering shaft in a first direction;
    continuously measuring a rotor angle Yt of a rotational position of the rotor with a rotor position sensor with a detection interval;
    continuously measuring an angle of rotation Xt1 of an absolute rotational position of the rotatably supported steering shaft with a steering angle sensor unit, wherein the angle of rotation Xt1 is detected with a gearing with a transmission factor UF at the detection interval;
    saving a measurement value pair from a rotor angle Xtlia, Yia if the angle of rotation Xt1 changes relative to a value measured at a directly-preceding detection point;
    powering the electric motor to shift the rotational position of the rotatably supported steering shaft in a second direction;
    continuously measuring the rotor angle Yt of the rotational position of the rotor by way of the rotor position sensor at the detection interval;
    continuously measuring the angle of rotation Xt1 of the absolute rotational position of the rotatably supported steering shaft with the steering angle sensor unit, wherein the angle of rotation Xt1 is detected with the gearing with the transmission factor UF;
    saving a measurement value pair from the rotor angle Xtlib, Yib if the angle of rotation Xt1 changes relative to a value measured at a directly-preceding detection point;
    forming a measurement tuple comprising an absolute angle of rotation of the rotatably supported steering shaft Xk0 as an average of both measured angles of rotation Xt1a and Xt1b, and a rotor angle Yk0 as an average of both measured rotor angles Ya and Yb; and saving the measurement tuple $Xk0$, $Yk0$ on a storage means and saving a value of zero as a current revolution number value N into a memory unit.

10. The method of claim 9 wherein after saving the measurement tuple $Xk0$, $Yk0$, the method comprises:
repowering the electric motor to shift the rotational position of the rotatably supported steering shaft into the first direction;
continuously measuring of the rotor angle $Yt$ of the rotational position of the rotor by way of the rotor position sensor;
continuously measuring the angle of rotation $Xt1$ of the absolute rotational position of the rotatably supported steering shaft with the steering angle sensor unit, wherein the angle of rotation $Xt1$ is detected with the gearing with the transmission factor UF;
upon reaching a predefined differential angle, saving a measurement value pair from the rotor angle $Xt1ia$, $Yia$;
powering the electric motor to shift the rotational position of the rotatably supported steering shaft into the second direction;
continuously measuring the rotor angle $Yt$ of the rotational position of the rotor with the rotor position sensor;
continuously measuring the angle of rotation $Xt1$ of the absolute rotational position of the rotatably supported steering shaft with the steering angle sensor unit, wherein the angle of rotation $Xt1$ is detected with the gearing with the transmission factor UF;
saving a measurement value pair from the rotor angle $Xt1ib$, $Yib$ if the angle of rotation $Xt1$ changes relative to a value measured at a directly-preceding detection point;
forming a measurement tuple comprising an absolute angle of rotation of the steering shaft $Xk$ as an average of both of the measured angles of rotation $Xt1a$ and $Xt1b$, and a rotor angle $Yk$ as an average of both of the measured rotor angles $Ya$ and $Yb$; and
saving the measurement tuple $Xk$, $Yk$, on a storage means.

11. The method of claim 9 comprising:
continuously measuring the rotor angle $Yt$ at the detection interval;
increasing the saved revolution number by one count and resaving as a current revolution number value N when the rotor angle $Yt$ grows by an amount of more than 80° between successive steps of the detection interval; and
decreasing the saved revolution number by one count and resaving as the current revolution number value N when the rotor angle $Yt$ declines by an amount of more than 80° between successive steps of the detection interval.

* * * * *